US006896831B2

(12) United States Patent
Shao

(10) Patent No.: US 6,896,831 B2
(45) Date of Patent: May 24, 2005

(54) PROCESS FOR PRODUCING PATTERNED ELASTIC SHEETINGS

(75) Inventor: Ten-Po Shao, Yung-Kang (TW)

(73) Assignee: Nam Liong Enterprise Co., Ltd., Tainan Hsien (TW)

( * ) Notice: Subject to any disclaimer, the term of this patent is extended or adjusted under 35 U.S.C. 154(b) by 283 days.

(21) Appl. No.: 10/351,408

(22) Filed: Jan. 27, 2003

(65) Prior Publication Data

US 2004/0080073 A1 Apr. 29, 2004

(51) Int. Cl.[7] .......................... B29O 7/00; B29C 37/00; B29C 39/12; B28B 7/14; B28B 3/06

(52) U.S. Cl. ....................... 264/160; 264/158; 264/163; 264/245; 264/297.4

(58) Field of Search ................................ 264/160, 158, 264/163, 245, 297.4

(56) References Cited

U.S. PATENT DOCUMENTS 5,534,208 A * 7/1996 Barr et al. .................. 264/160

* cited by examiner

*Primary Examiner*—Stephen J. Lechert, Jr.
(74) *Attorney, Agent, or Firm*—Baker Botts L.L.P.

(57) ABSTRACT

A process for producing patterned elastic sheetings comprises the steps of providing a pair of press rollers having opposite press surfaces respectively formed with at least one protrusion and one indentation, providing a laminate having at least two elastic sheet layers and one interface, placing the laminate between the rollers and causing the protrusion to press the laminate into the indentation so as to deform the laminate until the interface is deformed, cutting the laminate along a cutting plane that passes between the rollers and that passes through the laminate to divide the laminate into two parts, and causing the laminate to exit from the rollers to return the laminate to a non-deformed state. The interface deforms in a direction transverse to the cutting plane, and a pattern is formed in the laminate on two sides of the cutting plane after the laminate exits.

8 Claims, 7 Drawing Sheets

PROCESS FOR PRODUCING PATTERNED ELASTIC SHEETINGS

BACKGROUND OF THE INVENTION

1. Field of the Invention

The invention relates to a process for producing elastic sheetings, more particularly to a process for producing patterned elastic sheetings.

2. Description of the Related Art

Generally, an elastic patterned sheeting or laminate with a predetermined thickness can be made by hot pressing or cold pressing a foamed material. However, due to a long preheat processing time that is usually required during the forming stage, the laminate tends to shrink and change the material characteristics thereof so that the denseness and hardness of the laminate cannot be maintained uniformly, thereby resulting in defective products.

Thus, in order to eliminate the above-mentioned drawback, another conventional process has been proposed, wherein a single-layer foam with a predetermined thickness and dimension is fed into and pressed between upper and lower press rollers having protrusions and indentations, and is cut into two elastic sheetings by a cutter that passes between the press rollers before the foam returns to its non-deformed state. After the foam exits from the press rollers, it is divided into two elastic sheetings having complementary protruding and indenting patterns on their respective surfaces. This process is simple, and the material characteristics of the resultant elastic sheetings will not change. Although this conventional process can achieve its intended purpose, there is a need for a process that is more efficient and that can be used to produce elastic sheetings having a greater variety of patterns thereon.

SUMMARY OF THE INVENTION

Therefore, the main object of the present invention is to provide a process for producing two patterned elastic sheetings from a laminate so that the elastic sheetings have a greater variety of patterns thereon.

According to this invention, a process for producing patterned elastic sheetings comprises the steps of providing a pair of press rollers having opposite press surfaces respectively formed with at least one protrusion and at least one indentation opposite to the protrusion, providing a laminate which has at least two elastic sheet layers made of an elastomeric material and at least one interface between the elastic sheet layers, placing the laminate between the press rollers and causing the protrusion to press the laminate into the indentation so as to deform the laminate until the interface is deformed, cutting the laminate along a cutting plane that passes between the press rollers and that passes through the laminate to divide the laminate into two parts, and causing the laminate to exit from the press rollers to return the laminate to a non-deformed state. The interface deforms in a direction transverse to the cutting plane. A pattern is formed in the laminate on two sides of the cutting plane after the laminate exits.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
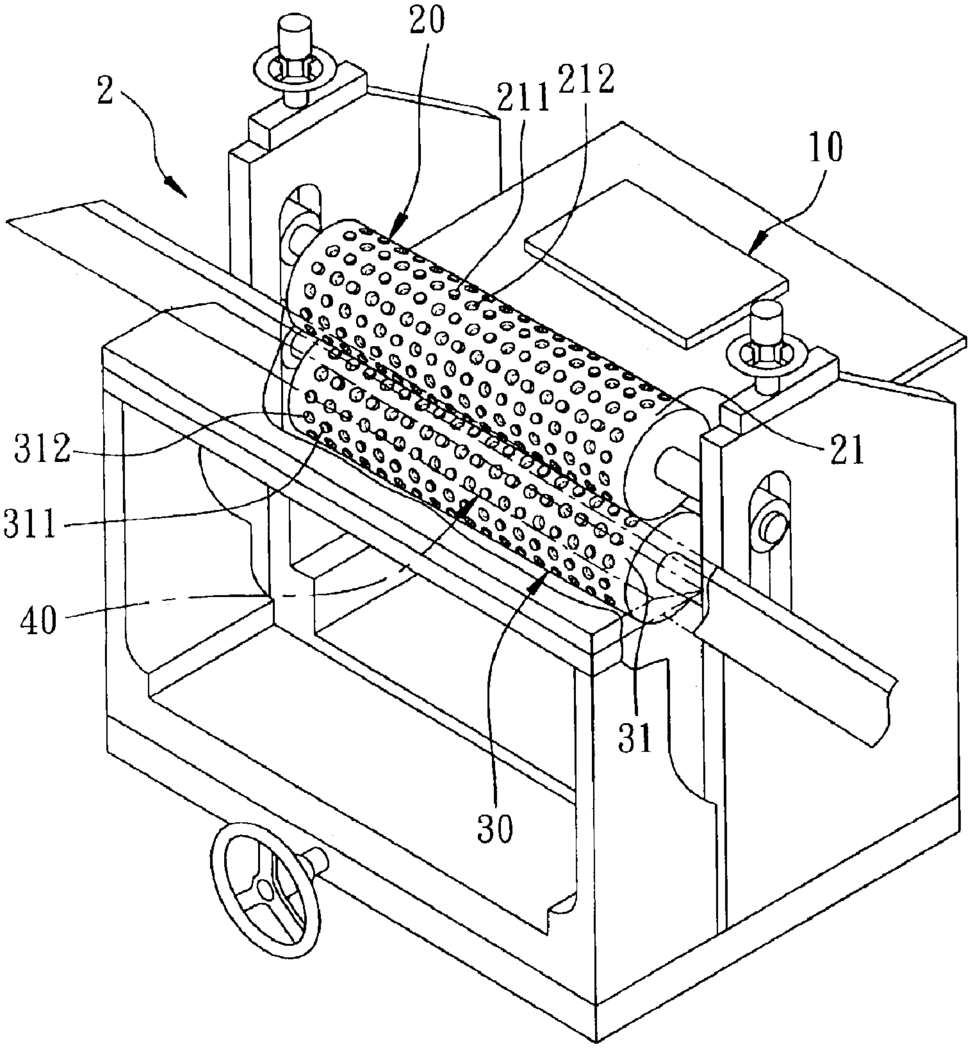
FIG. 1 illustrates a device used in a process according to the present invention.

Before the present invention is described in greater detail, it should be noted that like elements are denoted by the same reference numerals throughout the disclosure.

Figure 2:
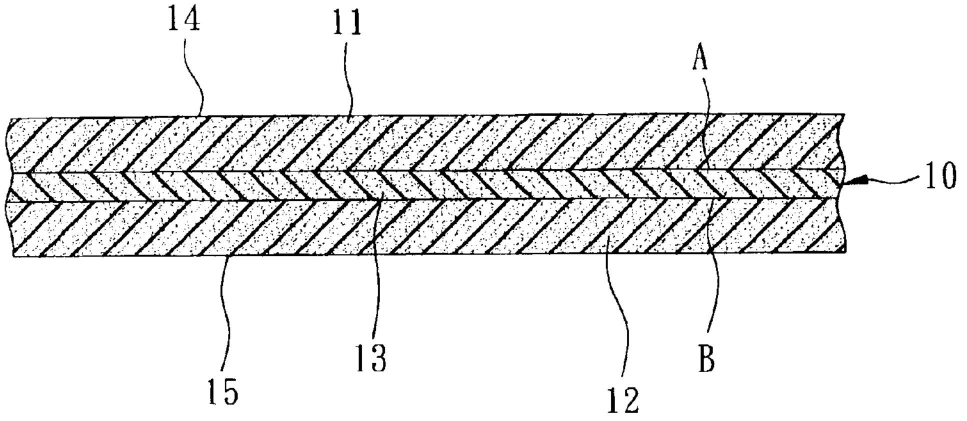
FIG. 2 is a fragmentary sectional view illustrating a laminate used in the first preferred embodiment of a process according to the present invention.

Referring to FIGS. 1 and 2, a device 2 is used in the first preferred embodiment of a process according to the present invention to process a laminate 10.

The laminate 10 includes two elastic sheet layers 11, 12 and an intermediate layer 13 disposed between and thinner than the elastic sheet layers 11, 12. An interface (A) is formed between the elastic sheet layer 11 and the intermediate layer 13, and an interface (B) is formed between the elastic sheet layer 12 and the intermediate layer 13. The elastic sheet layers 11, 12 and the intermediate layer 13 are all made of an elastomeric material, such as an elastomeric foam, but are provided with different colors.

Figure 3:
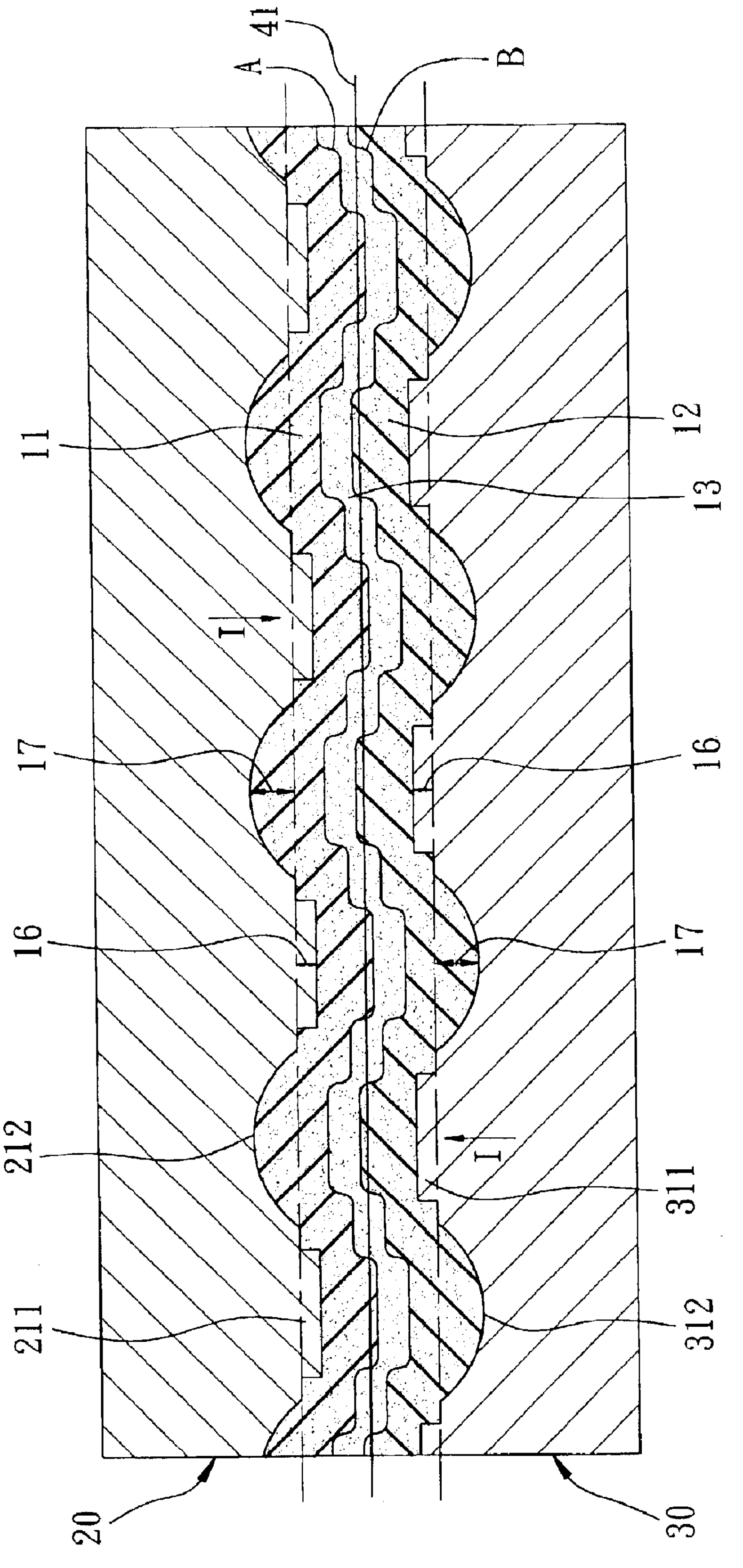
FIG. 3 is a sectional view that illustrates how the laminate of FIG. 2 is pressed by a pair of press rollers.

The device 2 includes a pair of press rollers 20, 30 that have opposite press surfaces 21, 31, each of which is formed with a plurality of protrusions 211, 311 and indentations 212, 312. As shown in FIG. 3, the protrusions 211 on the press surface 21 of the press roller 20 are opposite to the corresponding indentations 312 in the press surface 31 of the press roller 30, whereas the indentations 212 in the press surface 21 of the press roller 20 are opposite to the corresponding protrusions 311 on the press surface 31 of the press roller 30. The protrusions 211, 311 and the indentations 212, 312 are disposed alternately on each of the press surfaces 21, 31.

The laminate 10 is fed between the press rollers 20, 30 while the rollers 20, 30 are rotated. A cutter 40 is provided to cut the laminate 10 along a cutting plane 41 that passes between the press rollers 20, 30 and that passes through the intermediate layer 13 of the laminate 10. When the protrusions 211, 311 are moved toward the respective indentations 212, 312 along the direction of an arrow (I), as shown in FIG. 3, the top and bottom surfaces 14, 15 of the laminate 10 are pressed by the protrusions 211, 311 into the indentations 212, 312 until the interfaces (A, B) are deformed in a direction transverse to a cutting plane 41. The cutter 40 divides the laminate 10 into two elastic sheetings 10', 10"

having complementary cut surfaces 18, 19. The laminate 10 is thus formed with a plurality of indented deformations 16 and a plurality of protruded deformations 17. Each of the indented deformations 16 and the protruded deformations 17 makes a displacement larger than half the thickness of the intermediate layer 13. The cutter 40 is disposed within a space between the press rollers 20, 30, and is a high-speed rotary cutter that passes between the rollers 20, 30 repeatedly. The cutting plane 41 passes through the interface (A) of the elastic sheet layer 11 and the intermediate layer 13, and the interface (B) of the elastic sheet layer 12 and the intermediate layer 13.

Figure 5:
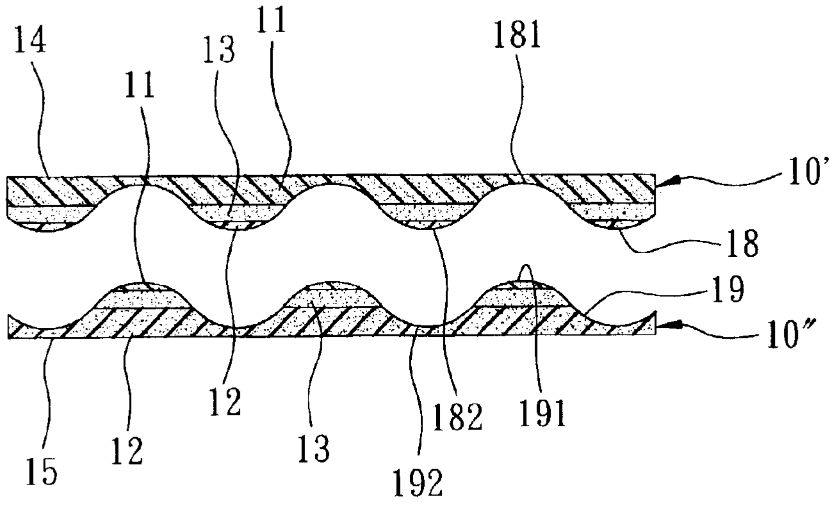
FIG. 5 is a sectional view taken along line 5—5 of FIG. 4.
Figure 4:
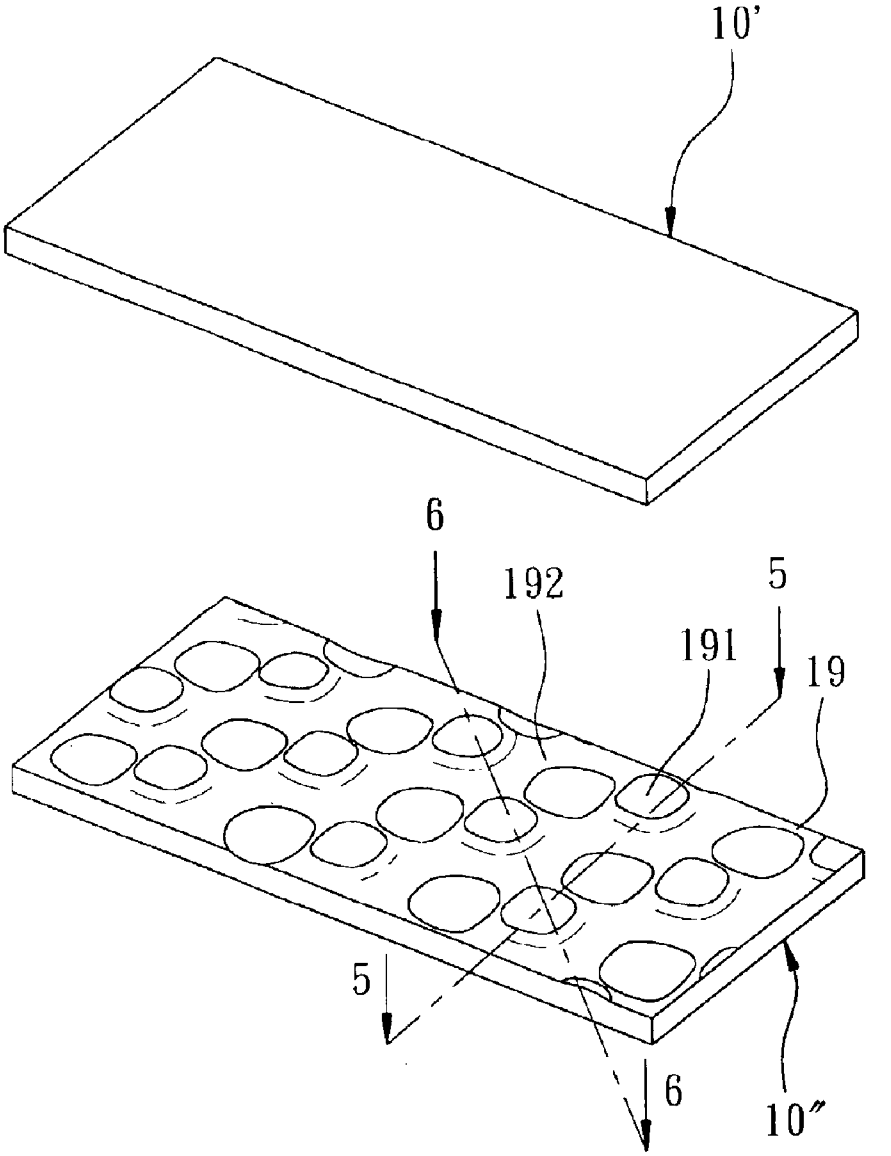
FIG. 4 is a perspective view showing two patterned elastic sheetings produced by the first preferred embodiment.
Figure 6:
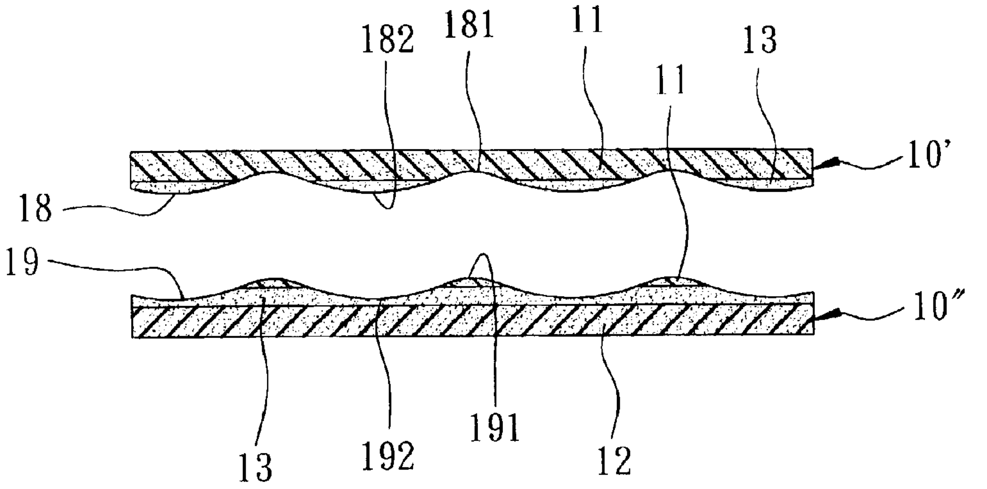
FIG. 6 is a sectional view taken along line 6—6 of FIG. 4.

Referring to FIGS. 4, 5, and 6, in combination with FIG. 3, after the laminate 10 exits from the press rollers 20, 30 and has been cut into two elastic sheetings 10', 10", the indented deformations 16 and the protruded deformations 17 of the laminate 10 return to a non-deformed state by a displacement in a direction opposite to the arrow (I). As the indented and protruded deformations 16, 17 of the elastic sheeting 10" return to the non-deformed state, the bottom surface 15 returns to a flat state, and the cut surface 19 is formed with protrusions 191 and indentations 192. As the indented and protruded deformations 16, 17 of the elastic sheeting 10' return to the non-deformed state, the top surface 14 returns to a flat state, and the cut surface 18 is formed with indentations 181 and protrusions 182 that complement the protrusions 191 and indentations 192. Referring to FIGS. 5 and 6, the sheetings 10' and 10" are protruding and indenting alternately on their cut surfaces 18, 19, and the protrusions 191, 182 are composed of two or three layers having different colors.

The aforementioned process not only can provide the elastic sheetings 10', 10" with different patterns and colors, but also can maintain the original material characteristics of the foam and the thickness thereof. The elastic sheet layers 11, 12 and the intermediate layer 13 can be chosen from materials having different physical characteristics so as to produce the desired product. For example, if the elastic sheetings 10', 10" are to be used as shoe soles, the elastic sheet layers 11, 12 may be made of a softer and air permeable foamed material so as to provide comfort, anti-slip characteristic, and air permeability that are required of the shoe soles, and the intermediate layer 13 may be made of a harder and non-permeable foamed material. As such, due to the alternate protrusions 182, 191 on the cut surfaces 18, 19 of the elastic sheetings 10', 10", the shoe soles can provide multidirectional air permeation and a massaging effect.

Figure 7:
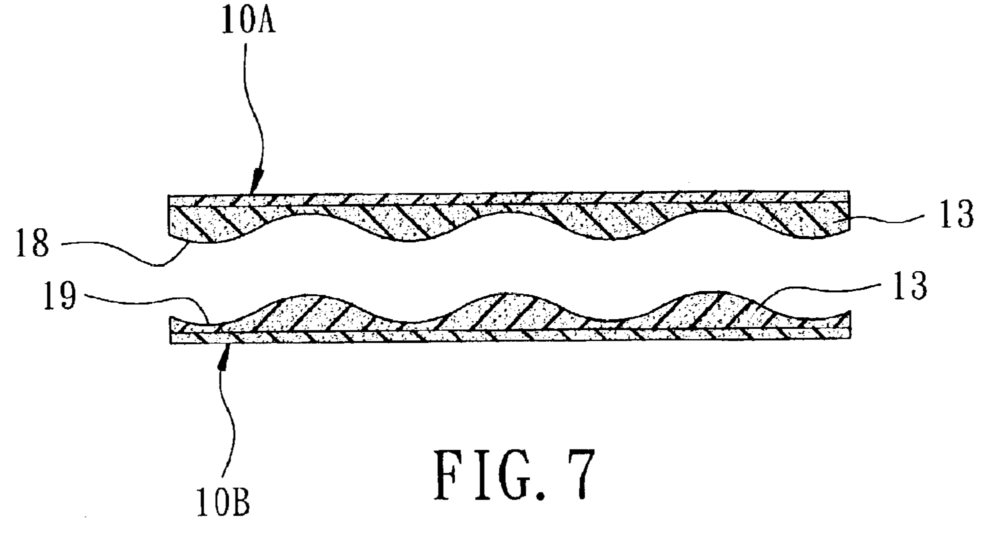
FIG. 7 is a sectional view of the patterned elastic sheetings produced by the second preferred embodiment of a process according to the present invention.

Referring to FIG. 7, in the second preferred embodiment of a process according to the present invention, the patterned elastic sheetings 10A and 10B are produced by using a three-layer laminate (not shown) having a thicker intermediate layer 13 as compared to the laminate 10 shown in FIG. 2. The laminate is cut along a cutting plane which passes only through the intermediate layer 13. When the laminate is pressed between the rollers 20, 30, the laminate deforms with a displacement which is smaller than half the thickness of the intermediate layer 13.

Figure 8:
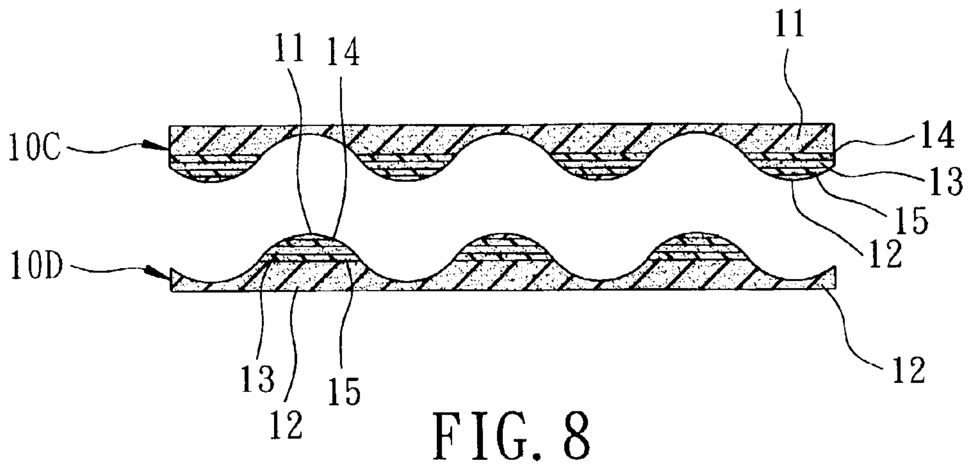
FIG. 8 is a sectional view of the patterned elastic sheetings produced by the third preferred embodiment of a process according to the present invention.

Referring to FIG. 8, in the third preferred embodiment of a process according to the present invention, two patterned elastic sheetings 10C and 10D are produced by using a five-layer laminate (not shown). The protrusions on each patterned elastic sheeting 10C or 10D has five layers, which are represented by numerals 11, 12, 13, 14, and 15, respectively. The layers 11, 12 are elastic sheet layers. The layers 13, 14 and 15 are intermediate layers. The cutting plane, in this embodiment, passes through the five layers 11, 12, 13, 14, 15 so that the protruding patterns on the elastic sheetings 10C, 10D can have different colors.

Figure 9:
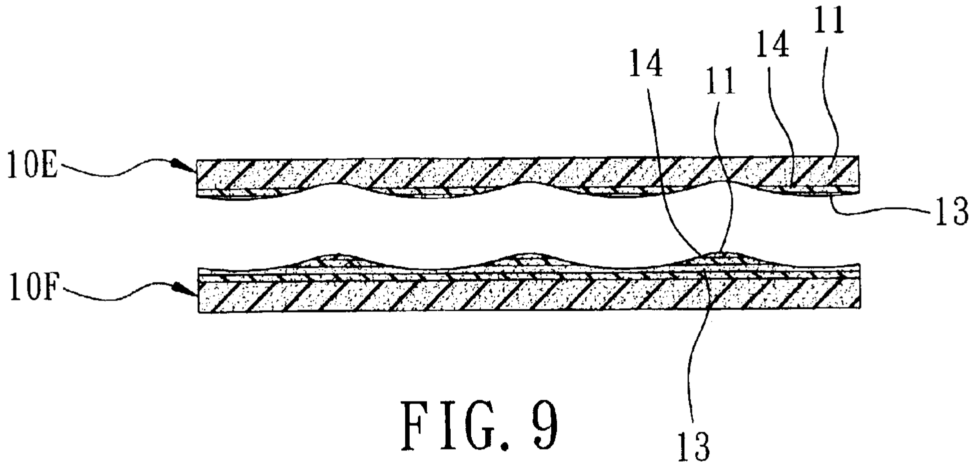
FIG. 9 is a sectional view of the patterned elastic sheetings produced by the fourth preferred embodiment of a process according to the present invention.

Referring to FIG. 9, in the fourth preferred embodiment of a process according to the present invention, two patterned elastic sheetings 10E and 10F are produced by using a five-layer laminate (not shown). In this embodiment, the cutting plane passes through the layers 11, 13 and 14 of the laminate so that the elastic sheetings 10E, 10F can have different patterns and colors.

Figure 10:
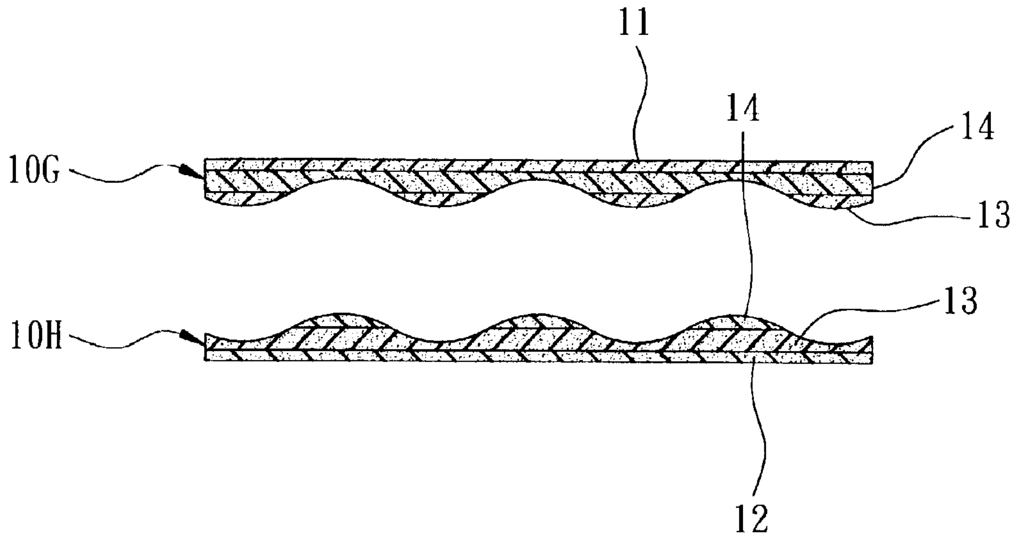
FIG. 10 is a sectional view of the patterned elastic sheetings produced by the fifth preferred embodiment of a process according to the present invention.

Referring to FIG. 10, in the fifth preferred embodiment of a process according to the present invention, two patterned elastic sheetings 10G and 10H are produced by using a four-layer laminate (not shown). In this embodiment, the cutting plane does not pass through the layers 11 and 12.

The present invention provides the following advantages:

1. Two patterned elastic sheetings of the present invention can be produced using a single cutting step. There is no need to conduct preheating process, cold press or hot press, which are time consuming. Thus, the present invention increases the production rate.
2. The elastic sheetings produced by the method of the present invention not only have protruding and indenting patterns, but also exhibit a variety of colors.
3. Since the thickness of the intermediate layers 13, 14, 15 can affect the colors of the protruding and indenting patterns on the elastic sheetings produced by the method of the present invention, altering the thickness, colors and materials of the intermediate layers can vary and diversify the patterns and colors of the products of the present invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A process for producing patterned elastic sheetings, comprising:

providing a pair of press rollers having opposite press surfaces respectively formed with at least one protrusion and at least one indentation opposite to said protrusion;

providing a laminate which has at least two elastic sheet layers made of an elastomeric material, and at least one interface between said elastic sheet layers;

placing said laminate between said press rollers and causing said protrusion to press said laminate into said indentation so as to deform said laminate until said interface is deformed;

cutting said laminate along a cutting plane that passes between said press rollers and that passes through said laminate to divide said laminate into two parts; and causing said laminate to exit from said press rollers to return said laminate to a non-deformed state, wherein said interface deforms in a direction transverse to said cutting plane, and a pattern is formed in said laminate on two sides of said cutting plane after said laminate exits.

2. The process as claimed in claim 1, wherein said elastic sheet layers are made of a foamed material.

3. The process as claimed in claim 1, wherein said cutting plane passes through said interface.

4. The process as claimed in claim 1, wherein each of said press surfaces include a plurality of said protrusions and said indentations, said protrusions on one of said press surfaces being opposite to said indentations in the other one of said press surfaces.

5. The process as claimed in claim 4, wherein said laminate further includes at least one intermediate layer of an elastomeric material between said elastic sheet layers, said intermediate layer being deformed with the deformation of said elastic sheet layers, said cutting plane passing through said intermediate layer.

6. The process as claimed in claim 5, wherein said intermediate layer has a color different from that of said elastic sheet layers.

7. The process as claimed in claim 5, wherein said protrusions and said indentations are disposed alternately on each of said press surfaces, said intermediate layer protruding and indenting alternately along directions transverse to said cutting plane.

8. The process as claimed in claim 5 wherein said laminate includes a plurality of said intermediate layers.

* * * * *